US008433648B2

(12) United States Patent
Keithley et al.

(10) Patent No.: US 8,433,648 B2
(45) Date of Patent: Apr. 30, 2013

(54) METHOD AND SYSTEM FOR ENGAGING IN A TRANSACTION BETWEEN A CONSUMER AND A MERCHANT

(75) Inventors: Thomas H. Keithley, Monkton, MD (US); Mark L. Lavelle, Govans, MD (US); Vincent W. Talbert, Cockeysville, MD (US)

(73) Assignee: Bill Me Later, Inc., Timonium, MD (US)

( * ) Notice: Subject to any disclaimer, the term of this patent is extended or adjusted under 35 U.S.C. 154(b) by 834 days.

(21) Appl. No.: 11/710,883

(22) Filed: Feb. 26, 2007

(65) Prior Publication Data
US 2008/0203153 A1    Aug. 28, 2008

(51) Int. Cl.
*G06Q 40/00*    (2012.01)
(52) U.S. Cl.
USPC .......................................................... 705/38
(58) Field of Classification Search .................... 705/38; 706/38
See application file for complete search history.

(56) References Cited

U.S. PATENT DOCUMENTS

| 3,920,908 A | 11/1975 | Kraus |
| 4,191,860 A | 3/1980 | Weber |
| 4,291,198 A | 9/1981 | Anderson et al. |
| 4,757,267 A | 7/1988 | Riskin |
| 4,969,183 A | 11/1990 | Reese |
| 4,996,705 A | 2/1991 | Entenmann et al. |
| 5,010,238 A | 4/1991 | Kadono et al. |
| 5,012,077 A | 4/1991 | Takano |
| 5,120,945 A | 6/1992 | Nishibe et al. |
| 5,329,589 A | 7/1994 | Fraser et al. |
| 5,446,885 A | 8/1995 | Moore et al. |
| 5,537,315 A | 7/1996 | Mitcham |
| 5,793,028 A | 8/1998 | Wagener et al. |
| 5,794,221 A | 8/1998 | Egendorf |
| 5,870,721 A | 2/1999 | Norris |
| 5,883,810 A | 3/1999 | Franklin et al. |
| 5,940,811 A | 8/1999 | Norris |
| 6,000,832 A | 12/1999 | Franklin et al. |
| 6,029,150 A | 2/2000 | Kravitz |
| 6,029,890 A | 2/2000 | Austin |
| 6,032,136 A | 2/2000 | Brake, Jr. et al. |
| 6,078,891 A | 6/2000 | Riordan et al. |
| 6,098,053 A | 8/2000 | Slater |
| 6,105,007 A | 8/2000 | Norris |
| 6,122,624 A | 9/2000 | Tetro et al. |
| 6,188,994 B1 | 2/2001 | Egendorf |
| 6,202,053 B1 | 3/2001 | Christiansen et al. |
| 6,227,447 B1 | 5/2001 | Campisano |

(Continued)

FOREIGN PATENT DOCUMENTS

| EP | 0 338 568 A2 | 10/1989 |
| EP | 0 829 813 A1 | 3/1998 |

(Continued)

*Primary Examiner* — Ella Colbert
*Assistant Examiner* — Scott S Trotter
(74) *Attorney, Agent, or Firm* — Haynes and Boone, LLP

(57) ABSTRACT

Disclosed is a method for engaging in a transaction between a consumer and a merchant. In particular, the present invention is directed to a method and system for providing instant credit by a credit issuer to the consumer at a point-of-sale of the merchant. In addition, the present invention is directed to a method and system for identifying at least one optimal credit product from a plurality of credit products of at least one credit issuer to a consumer.

32 Claims, 4 Drawing Sheets

U.S. PATENT DOCUMENTS

| | | |
|---|---|---|
| 6,289,319 B1 | 9/2001 | Lockwood |
| 6,317,783 B1 | 11/2001 | Freishtat et al. |
| 6,332,134 B1 | 12/2001 | Foster |
| 6,341,724 B2 | 1/2002 | Campisano |
| 6,351,739 B1 | 2/2002 | Egendorf |
| 6,477,578 B1 | 11/2002 | Mhoon |
| 6,505,171 B1 | 1/2003 | Cohen et al. |
| 6,675,153 B1 | 1/2004 | Cook et al. |
| 6,704,714 B1 | 3/2004 | O'Leary et al. |
| 6,785,661 B1 | 8/2004 | Mandler et al. |
| 6,820,202 B1 | 11/2004 | Wheeler et al. |
| 6,839,690 B1 | 1/2005 | Foth et al. |
| 6,839,692 B2 | 1/2005 | Carrott et al. |
| 6,868,408 B1 | 3/2005 | Rosen |
| 6,883,022 B2 | 4/2005 | Van Wyngarden |
| 6,889,325 B1 | 5/2005 | Sipman et al. |
| 6,901,384 B2 * | 5/2005 | Lynch et al. .................. 705/38 |
| 6,915,272 B1 | 7/2005 | Zilliacus et al. |
| 6,931,382 B2 | 8/2005 | Laage et al. |
| 6,957,334 B1 | 10/2005 | Goldstein et al. |
| 6,970,853 B2 | 11/2005 | Schutzer |
| 6,976,008 B2 | 12/2005 | Egendorf |
| 6,980,970 B2 | 12/2005 | Krueger et al. |
| 7,006,986 B1 | 2/2006 | Sines et al. |
| 7,051,001 B1 | 5/2006 | Slater |
| 7,107,243 B1 | 9/2006 | McDonald et al. |
| 7,177,836 B1 | 2/2007 | German et al. |
| 7,263,506 B2 | 8/2007 | Lee et al. |
| 7,406,442 B1 | 7/2008 | Kottmeier, Jr. et al. |
| 7,542,922 B2 * | 6/2009 | Bennett et al. .................. 705/26 |
| 2001/0034702 A1 | 10/2001 | Mockett et al. |
| 2001/0034724 A1 | 10/2001 | Thieme |
| 2002/0007302 A1 | 1/2002 | Work et al. |
| 2002/0007341 A1 | 1/2002 | Lent et al. |
| 2002/0023051 A1 * | 2/2002 | Kunzle et al. .................. 705/38 |
| 2002/0032860 A1 | 3/2002 | Wheeler et al. |
| 2002/0035538 A1 | 3/2002 | Moreau |
| 2002/0052833 A1 | 5/2002 | Lent et al. |
| 2002/0069166 A1 | 6/2002 | Moreau et al. |
| 2002/0087467 A1 | 7/2002 | Mascavage, III et al. |
| 2002/0099649 A1 | 7/2002 | Lee et al. |
| 2002/0107793 A1 | 8/2002 | Lee |
| 2002/0112160 A2 | 8/2002 | Wheeler et al. |
| 2002/0120537 A1 | 8/2002 | Morea et al. |
| 2002/0120864 A1 | 8/2002 | Wu et al. |
| 2002/0156688 A1 | 10/2002 | Horn et al. |
| 2002/0178071 A1 | 11/2002 | Walker et al. |
| 2002/0198822 A1 | 12/2002 | Munoz et al. |
| 2003/0036996 A1 | 2/2003 | Lazerson |
| 2003/0061157 A1 | 3/2003 | Hirka et al. |
| 2003/0120615 A1 | 6/2003 | Kuo |
| 2003/0144952 A1 | 7/2003 | Brown et al. |
| 2003/0200184 A1 | 10/2003 | Dominguez et al. |
| 2004/0078328 A1 | 4/2004 | Talbert et al. |
| 2004/0111362 A1 | 6/2004 | Nathans et al. |
| 2004/0151292 A1 | 8/2004 | Larsen |
| 2004/0186807 A1 | 9/2004 | Nathans et al. |
| 2005/0038715 A1 | 2/2005 | Sines et al. |
| 2005/0071266 A1 | 3/2005 | Eder |
| 2005/0125336 A1 | 6/2005 | Rosenblatt et al. |
| 2005/0131808 A1 | 6/2005 | Villa |
| 2005/0246278 A1 | 11/2005 | Gerber et al. |
| 2006/0064372 A1 | 3/2006 | Gupta |
| 2006/0106699 A1 | 5/2006 | Hitalenko et al. |
| 2006/0178988 A1 | 8/2006 | Egendorf |
| 2006/0184428 A1 | 8/2006 | Sines et al. |
| 2006/0184449 A1 | 8/2006 | Eder |
| 2006/0184570 A1 | 8/2006 | Eder |
| 2006/0226216 A1 | 10/2006 | Keithley et al. |
| 2006/0229974 A1 | 10/2006 | Keithley et al. |
| 2006/0229996 A1 | 10/2006 | Keithley et al. |
| 2006/0265335 A1 | 11/2006 | Hogan et al. |
| 2006/0266819 A1 | 11/2006 | Sellen et al. |
| 2006/0289621 A1 | 12/2006 | Foss, Jr. et al. |
| 2007/0005445 A1 | 1/2007 | Casper |
| 2007/0038485 A1 | 2/2007 | Yeransian et al. |
| 2007/0056019 A1 | 3/2007 | Allen et al. |
| 2007/0063017 A1 | 3/2007 | Chen et al. |
| 2007/0073889 A1 | 3/2007 | Morris |
| 2007/0080207 A1 | 4/2007 | Williams |
| 2007/0094095 A1 | 4/2007 | Kilby |
| 2007/0094114 A1 | 4/2007 | Bufford et al. |
| 2007/0250919 A1 | 10/2007 | Shull et al. |
| 2007/0288375 A1 | 12/2007 | Talbert et al. |
| 2008/0040275 A1 | 2/2008 | Paulsen et al. |
| 2008/0046334 A1 | 2/2008 | Lee et al. |
| 2008/0052244 A1 | 2/2008 | Tsuei et al. |
| 2008/0167956 A1 | 7/2008 | Keithley |
| 2008/0195528 A1 | 8/2008 | Keithley |

FOREIGN PATENT DOCUMENTS

| | | |
|---|---|---|
| EP | 1223524 A2 | 7/2002 |
| WO | WO 88/10467 A1 | 12/1988 |
| WO | WO 00/02150 A1 | 1/2000 |
| WO | WO 00/67177 A2 | 11/2000 |

* cited by examiner

METHOD AND SYSTEM FOR ENGAGING IN A TRANSACTION BETWEEN A CONSUMER AND A MERCHANT

BACKGROUND OF THE INVENTION

1. Field of the Invention

The present invention relates generally to credit systems and credit issuer/consumer relationships, and in particular, to a method and system for engaging in a transaction between a consumer and a merchant, offering credit at a point-of-sale and identifying at least one optimal credit product of a credit issuer for a consumer and offering the optimal product to the consumer for consideration.

2. Description of the Related Art

According to the prior art, when a consumer wishes to obtain a credit product, such as a credit card or credit account, from a credit issuer, such as a bank, the consumer fills out an application, whether in hard copy of electronic form, and submits this application to the credit issuer. Once the appropriate information is received from the consumer, the credit issuer will make a decision regarding whether the applicant is eligible for credit product. If the person is, indeed, eligible, and meets the necessary requirements, the credit issuer establishes and account and provides the consumer with either the appropriate account information, or in most cases, a physical credit card for use in engaging in transactions. In addition, in order to successfully consummate the transaction, the consumer must have some preexisting relationship with some credit provider in order to facilitate any non-cash transaction, e.g., an online transaction, a telephone transaction, etc. Therefore, in order to engage in some non-cash purchase, the consumer must obtain credit, initiate the transaction with the merchant, and utilize the obtained credit product to consummate the transaction and receive the goods and/or services. Therefore, there is a need for some payment option in a non-cash transaction that does not require a preexisting credit relationship.

In some situations, the consumer applies for a credit level or credit product type for which he or she is not eligible. For example, the consumer may apply for a "gold" credit card from the credit issuer, but is only eligible for the "silver" credit card. Accordingly, the credit issuer will issue a notification to the applicant that he or she is unfortunately not eligible for the "gold" card, but is for the "silver" card. Such an offer from the credit issuer is often referred to as a "down sell". However, presently, this "down sell" is only used in connection with a single type of card and/or in connection with a single and discrete credit issuer. Therefore, the "down sell" represents only a downward qualification, which would be preferable to outright denial of the applicant, since the issuer is attempting to maximize sales and profit.

The "down sell" is fairly common, but extremely limited, i.e., limited to one issuer, limited to one type of card, etc. However, the credit issuer may have a number of different goals and objectives with respect to new or upgrading applicants. For example, the credit issuer may wish to control transactional costs, maximize sales, control risk, maximize long-term sales, maximize short-term sales, encourage co-branded products, etc. There are presently no methods and systems that take specific credit issuer (or affiliated merchant) objectives into account when offering credit products to the consumer, whether in a "down sell" or "up sell" situation.

There are many available credit products offerings to which a consumer may respond. However, the consumer may also have certain goals and objectives when searching for the optimal credit product, e.g., low interest rate, high loan level, minimal penalties, special advantages and perks, etc. Further, the consumer often would like to consider a variety of credit issuers, as well as a variety of credit products for each credit issuer. Therefore, there is a need for a method and system that would take the consumer's objectives into account, and provide the consumer with the optimal credit product (or appropriate products).

SUMMARY OF THE INVENTION

Therefore, it is an object of the present invention to provide a method and system for providing instant credit to a consumer engaged in a non-cash relationship with a merchant. It is a further object of the present invention to provide a method and system for facilitating a credit transaction between a consumer and a merchant. It a still further object of the present invention to provide a method and system for identifying optimal credit products for use in a transaction between a credit issuer and a consumer. It is another object of the present invention to provide a method and system for identifying optimal credit products that take into account consumer selection data and/or credit issuer selection data. It is a further object of the present invention to provide a method and system for identifying optimal credit products that offer at least one optimal credit product to a consumer based upon a credit issuer's goals and objectives. It is a still further object of the present invention to provide a method and system for identifying optimal credit products that offer at least one optimal credit product to a consumer based upon a consumer's goals and objectives. It is yet another object of the present invention to provide a method and system for identifying optimal credit products that operates effectively in both a "down sell" and an "up sell" situation. It is a further object of the present invention to provide a method and system of identifying optimal credit products that a optimized and presented to the consumer for selection.

Accordingly, in one embodiment, the present invention is directed to a method for providing instant credit by a credit issuer to a consumer at a point-of-sale of a merchant. The method includes the steps of: initiating or engaging in a transaction between the consumer and the merchant at the point-of-sale; obtaining a consumer/transaction data set including a plurality of data fields populated with data reflecting the consumer, the merchant, the transaction, the credit issuer or any combination thereof; analyzing at least a portion of the consumer/transaction data set; based upon the results of the analysis: (i) offering instant credit by the credit issuer to the consumer at the point-of-sale; or (ii) preventing an offer of instant credit by the credit issuer to the consumer at the point-of-sale; and if instant credit is offered to the consumer: (i) accepting, by the consumer, the offer of instant credit; and (ii) consummating the transaction between the consumer and the merchant using the provided instant credit.

The present invention is further directed to a method for identifying at least one optimal credit product from a plurality of credit products of at least one credit issuer to a consumer. The method includes the steps of: providing a credit issuer selection data set including a plurality of data fields to a central optimization database; providing a consumer selection data set including a plurality of data fields to the central optimization database; determining at least one optimal credit product to be offered by the at least one credit issuer to the consumer based upon: (i) at least one data field in the credit issuer selection data set, (ii) at least one data field in the consumer selection data set, or any combination thereof; and offering at least one optimal credit product, by the at least one credit issuer, to the consumer.

In a further embodiment, the present invention is directed to an apparatus for providing instant credit by a credit issuer to a consumer at a point-of-sale of a merchant. The apparatus includes a storage mechanism including an central database, and at least one input mechanism for transmitting a consumer/transaction data set including a plurality of data fields populated with data reflecting the consumer, the merchant, the transaction, the credit issuer or any combination thereof, to the central database. Further, a processor mechanism is configured to: (i) analyze at least a portion of the consumer/transaction data set; and (ii) based upon the results of the analysis: (a) offer instant credit by the credit issuer to the consumer at the point-of-sale; or (ii) prevent an offer of instant credit by the credit issuer to the consumer at the point-of-sale. The apparatus also includes an output mechanism for offering the instant credit to the consumer at the point-of-sale.

In another embodiment, the present invention is directed to an apparatus for identifying at least one optimal credit product from a plurality of credit products of at least one credit issuer to a consumer. The apparatus includes a storage mechanism with a central optimization database and at least one input mechanism for transmitting a credit issuer selection data set including a plurality of data fields to a central optimization database and for transmitting a consumer selection data set including a plurality of data fields to the central optimization database. The apparatus further includes a processor mechanism configured to determine at least one optimal credit product to be offered by the at least one credit issuer to the consumer based upon: (i) at least one data field in the credit issuer selection data set; (ii) at least one data field in the consumer selection data set, or any combination thereof. In addition, an output mechanism is provided for offering at least one optimal credit product, by the at least one credit issuer, to the consumer.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

Figure 1:
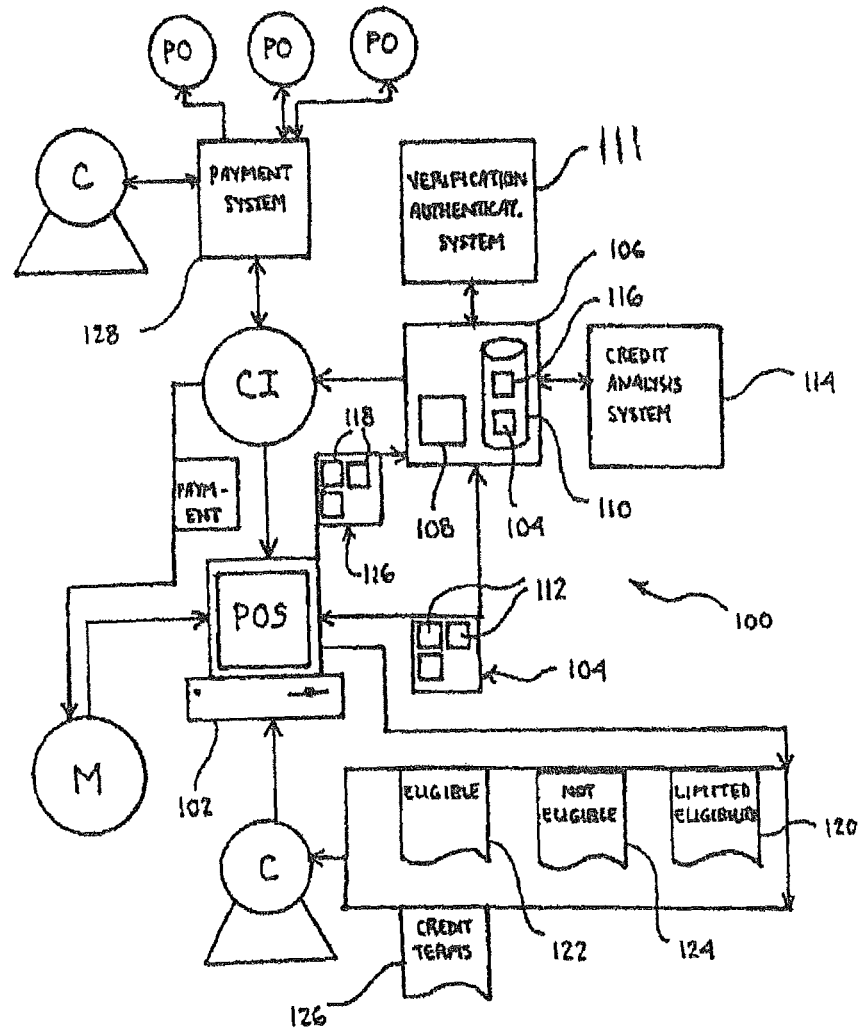
FIG. 1 is a schematic view of one embodiment of a method and system for providing instant credit by a credit issuer to a consumer at a point-of-sale of a merchant according to the present invention.

The present invention is directed to a method and system 100 for providing instant credit by a credit issuer CI to a consumer C at a point-of-sale POS of a merchant M. In particular, as shown in one preferred and non-limiting embodiment in FIG. 1, the present invention begins with the consumer C initiating, engaging in or otherwise interacting with a merchant M at the point-of-sale POS. While the system 100 is particularly useful in connection with online transactions, e.g., transactions over the Internet, at a merchant M portal, etc., it is equally useful in extending instant credit to consumers C at any type or variety of point-of-sale, such as over the telephone, in the mail, at an in-store location, etc. In the present embodiment, the point-of-sale POS is at an online location of the merchant M, such that the point-of-sale POS is a consumer's computer 102 (output mechanism). Accordingly, all of the consumer C, the credit issuer CI and the merchant M interact with or otherwise communicate with the computer 102 over a network, e.g., the Internet, a virtual private network, etc.

Next, a consumer/transaction data set 104 is obtained by or otherwise transmitted to a central system 106, which includes a processor mechanism 108 and a storage mechanism 110. This consumer/transaction data set 104 includes a plurality of fields 112 populated with data reflecting the consumer C, the merchant M, the transaction, the credit issuer CI, etc. Once this data set 104 is received at the central system 106, it is analyzed or processed by the processor mechanism 108. Based upon this analysis, the credit issuer CI and/or central system 106 offers (or authorizes the offer of) instant credit to the consumer C at the point-of-sale POS, in this embodiment, the computer 102. In addition, and also based upon this analysis, the credit issuer CI and/or the central system 106 may prevent such an offer to the consumer C. If the instant credit is offered to the consumer C, the system 100 further enables the consumer C to accept the offer of instant credit, and consummates the transaction between the consumer C and the merchant M using the instant credit.

The consumer/transaction data set 104 may include a variety of data points and information. For example, the fields 112 may be populated with data reflecting a consumer's C name, a consumer C key, a consumer C identification, an account number, an address, a city, a state, a zip code, a country, a telephone number, an e-mail address, a social security number, a date of birth, the merchant's M name, an identification, a credit issuers' CI name, credit issuer CI data, credit data, credit product data, credit rate data, credit terms data, credit product benefits data, a product identification, a service identification, a company identity, a merchant M identity, consumer credit account balance, merchant M history, private label entity data, affiliated private label entity, transaction data, transaction type, transaction amount, etc.

Accordingly, the presently-invented system 100 allows for the receipt of instant credit by a qualified consumer C at the point-of-sale POS. Further, this instant credit is extended to the consumer automatically, and used to consummate the transaction with the merchant M, such that the merchant M ships the goods or begins the services based upon this credit. In this manner, the consumer C only need provide certain basic information and data in the consumer/transaction data set 104 in order to obtain instantaneous credit from the credit issuer CI and/or central system 106.

In a further embodiment, the system 100 includes a verification/authentication system 111. This system 111 is in communication with or otherwise a part of the central system 106, and is used to verify or authenticate the consumer C prior to offering the instant credit to him or her. This verification by the verification/authentication system 111 is based at least in part upon the data in the consumer/transaction data set 104. Of course, if the system 100 requires additional information or data from the consumer C, the merchant M, the credit issuer CI or other parties, it either automatically requests such information, or otherwise instructs the user to obtain this data. Therefore, the verification/authentication system 111 ensures that the offer of instant credit to the consumer C is appropriate and directed to the correct entity or identified consumer C.

In another embodiment, the system includes a credit analysis system 114, which is supplied with a consumer data set 116 having a plurality of data fields 118 populated with data reflecting the consumer C, the merchant M, the transaction, etc. This system 114 is used to analyze the credit of the consumer C prior to extending the instant credit, and may also be used to analyze the type of transaction, the amount of the contemplated transaction, etc. The credit analysis system 114 analyzes one or more of the fields 118 in the consumer data set 116 and makes a credit decision. As discussed above, if the system 114 requires additional information or data to successfully complete the analysis, this data may be requested, as appropriate, from any of the parties to the transaction.

Based upon the analysis by the credit analysis system 114, the system 106 and/or the credit issuer CI makes the decision to offer the instant credit to the consumer C, or prevent such an offer from being presented at the point-of-sale POS. Of course, it is also envisioned that the credit analysis system 114 obtains the required information or data in the consumer data set 116 prior to the consumer C engaging in the transaction with the merchant M. This means that the consumer C may be pre-screened and/or pre-approved for the instant credit prior to the actual transaction. During the transaction, once the consumer/transaction data set 104 is transmitted or communicated to the central system 106, the consumer C may be verified by the verification/authentication system 111, and the instant credit is automatically provided or offered to the consumer C at the point-of-sale POS based upon the pre-screening or pre-approval. Such a method could also be used to automatically deny or prevent the instant credit from being offered to the consumer C.

The credit analysis performed by the credit analysis system 114 may perform a variety of functions and drive a variety of responses or communications from the credit issuer CI and/or the central system 106 to the consumer C. For example, based upon the credit analysis, the system 100 may provide a communication 120 to the consumer C that he or she is only able to use a limited amount (partial amount of the transaction) of instant credit at the point-of-sale. A communication 122 may be used to inform the consumer C that he or she is, indeed, eligible for instant credit. Another communication 124 may be used to inform the consumer C that the transaction is not eligible for instant credit, based upon transaction data, transaction type, transaction amount, merchant data, consumer data, etc. For example, the transaction type may be too risky to provide instant credit to the consumer C, or alternatively, the amount of the transaction may be much too high for the provision of instant credit. However, the communication 124 may indicate that the consumer C is eligible for another type of transaction or more-limited transaction amount.

The consumer data set 116 may include a variety of data. For example, the fields 118 may be populated with data reflecting a consumer's C name, a consumer C key, a consumer C identification, an account number, an address, a city, a state, a zip code, a country, a telephone number, an e-mail address, a social security number, a date of birth, the merchant's M name, an identification, a credit issuers' CI name, credit issuer CI data, credit data, credit product data, credit rate data, credit terms data, credit product benefits data, a product identification, a service identification, a company identity, a merchant M identity, consumer C credit account balance, merchant M history, private label entity data, affiliated private label entity, transaction data, transaction type, transaction amount historical interaction between the consumer C and the credit issuer CI, historical data, merchant M data, previous consumer/credit issuer transaction data, consumer C creditworthiness, consumer C credit quality, size of purchase, type of purchase, consumer C demographic data, consumer C age, consumer C location, consumer C income, consumer C credit data, consumer C purchasing behavior, consumer C purchasing behavior with a specified credit issuer CI, credit issuer CI sales objectives, credit issuer CI goals, consumer C purchasing history, consumer C status, consumer C lifetime value to credit issuer CI, credit issuer CI input data, consumer C input data, product credit rate, product credit terms, product benefit data, product relationships, product tie-ins, consumer C purchasing behavior at a specified merchant M, merchant M objectives, merchant M goals, consumer C lifetime value to merchant M, merchant M input data, a transaction amount, a consumer C purchase demographic, a product identification, a service identification, consumer C type, a company identity, a merchant M identity, a third-party risk score, risk data, authentication data, verification data, consumer C rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, previous transaction data, time between transactions data, previous transaction amount, previous transaction approval status, previous transaction time stamp data, a response code, active trades in database, public record data, trade line data, transaction medium, credit segment data, consumer payment type, consumer C payment method, consumer C payment history, consumer C account history, consumer C credit account balance, merchant M history, private label entity data, affiliated private label entity, consumer/merchant historical data, negative consumer/credit issuer data, positive consumer/credit issuer data, etc.

In another embodiment, prior to the offer of instant credit to the consumer C, the system 100 provides for the presentation of credit terms 126 to the consumer C. For example, the consumer C may be presented with basic credit terms, a Terms & Conditions page, a basic credit contract or other simplified agreement. In general, the credit terms 126 would signify the consumer's willingness to eventually satisfy the debt incurred by using the instant credit of the credit issuer CI.

After the transaction is consummated, and the goods and/or services delivered or performed, the consumer C must then satisfy his or her debt. Therefore, the system 100 further includes some payment system 128, which presents, to the consumer C, a variety and plurality of payment options PO. These payment options PO are then used to satisfy some or all of the instant credit provided by the credit issuer CI and/or central system 106 to the consumer C. As discussed hereinafter, the type, order, method and system for use in providing these payment options PO may be optimized. Further, these payment options PO may be in the form of an e-check, a check, cash, an ACH product, a credit card, a new credit account, an online credit account, an existing credit account, a minimum payment on account, a debit account, etc.

Prior to presenting the payment options PO to the consumer C, the credit analysis system 114 may be used to analyze the credit of the consumer C and provide appropriate payment options PO thereto. For example, and as discussed in greater detail hereinafter, the credit analysis system 114 may make the necessary credit decision to list and/or optimize the various payment options PO available to the consumer C based upon the consumer/transaction data set 104 and/or the consumer data set 116.

Once presented, the consumer C selects one or more of the payment options PO to satisfy the incurred debt. In one embodiment, the consumer C selects a payment option PO that is a credit product, such as a credit card, an online credit account, etc. Therefore, if eligible, verified, authenticated, etc., the credit account is activated and used to pay off the instant credit involved in the transaction. Of course, the consumer C may select more than one payment option PO and segregate all or a portion of the total instant credit amount to be satisfied by one or more separate payment options PO. For example, one payment option PO may be a credit offer with certain benefits if the amount transferred is at a specified amount. Accordingly, the consumer C may wish to allocate that amount to that specific payment option PO, and satisfy the remaining instant credit debt using some other vehicle, e.g., cash, e-check, debit, etc. In this manner, the consumer C is provided with a seamless method and system 100 for obtaining instant credit at the point-of-sale POS, and satisfying the debt using a variety of payment options in the future.

The present invention is also directed to a method and system 10 for identifying one or more optimal credit products for use in connection with and between one or more consumers C and one or more credit issuers CI. The present method and system 10 is equally useful in connection with multiple consumers C, multiple credit issuers CI (whether affiliated or not), various types and levels of credit products, as well as co-brand situations and merchant affiliations. Accordingly, the present method and system 10 is an optimization process that, when provided the appropriate data, serves to identify at least one, and typically multiple, credit products for offering from one or more credit issuers CI to the consumer C. For example, the system 10 could be used in presenting the payment options PO to the consumer C for satisfying the debt incurred as instant credit in connection with system 100.

In one embodiment, a credit issuer selection data set 12, which includes multiple data fields 14, is provided to an optimization database 16, such as a database resident on a central server or centralized data warehouse. In addition, a consumer selection data set 18, which includes a plurality of data fields 20, is also provided to the optimization database 16. Of course, one or more fields 112, 118 of the consumer/transaction data set 104 and/or the consumer data set 116 may be used to complement or enhance the consumer selection data set 18. Therefore, the optimization database 16 may be linked to or associated with the database on the storage mechanism 110. Once the appropriate data fields 14, 20 have been obtained and stored in the optimization database 16, a determination is made. Specifically, the method and system 10 determines and identifies at least one optimal credit product 22 to be offered by the credit CI to the consumer C. Further, this determination is made based upon at least one data field 14 in the credit issuer selection data set 12 and/or at least one data field 20 in the consumer selection data set 18. In this manner, one or more optimal credit products 22 are identified. Next, this optimal credit product 22 is offered by the credit issuer CI to the consumer C or otherwise presented to the consumer C, such as through the payment system 128 discussed above in connection with system 100.

As discussed above, a plurality of optimal credit products 22 may be offered or presented to the consumer C. Accordingly, these optimal credit products 22 can be presented or offered to the consumer in a variety of forms. For example, the products 22 can be offered in hard copy form, wireless form, electronic form, on a computing device, on a display device, over the Internet, as a web page, on a graphical user interface, at a point-of-sale, before a transaction, during a transaction, upon completion of a transaction, etc. In this manner, the optimal credit products 22 can be presented to the consumer in a form of a listing 24, which the consumer C can peruse and make some eventual selection.

Figure 2:
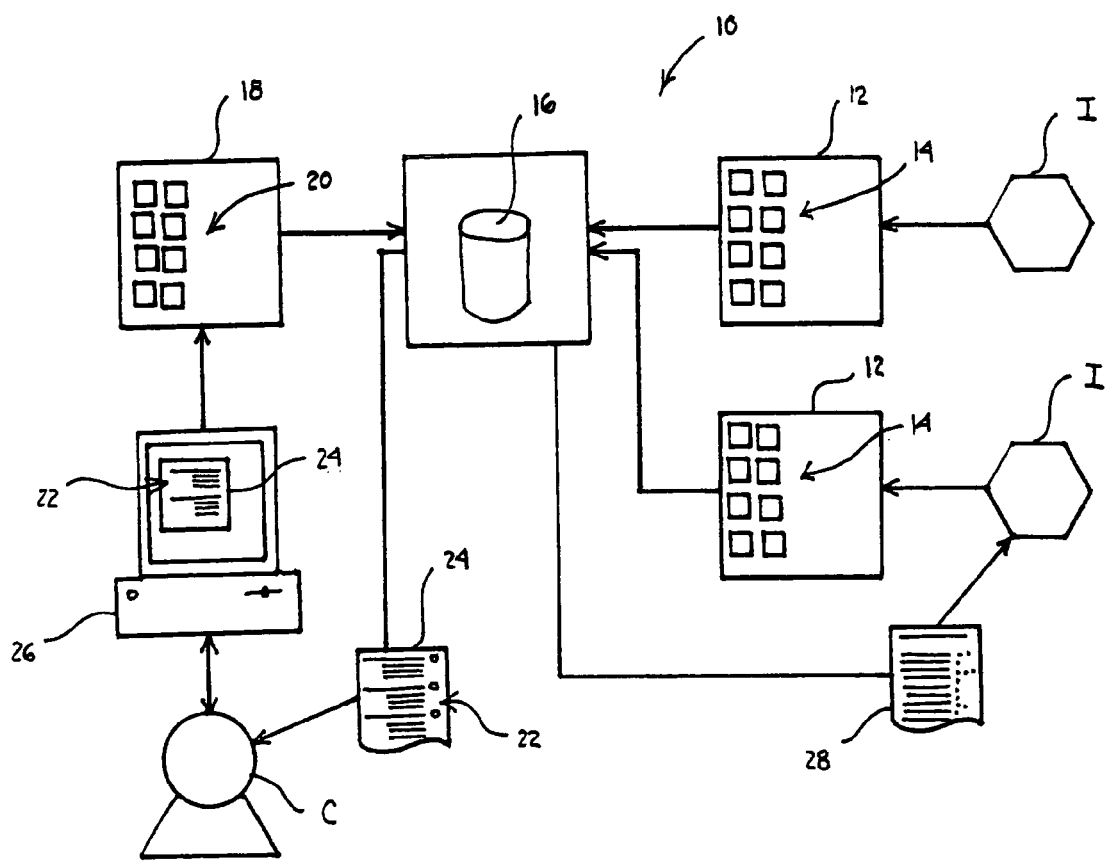
FIG. 2 is a schematic view of one embodiment of a method and system for identifying at least one optimal credit product according to the present invention.

As seen in FIG. 2, the consumer C enters the consumer selection data set 18 through an interface device 26, such as a personal computer 102 operating in a network (such as the Internet), and this data set 18 is transmitted to the database 16. At least one, and preferably multiple, credit issuers CI have provided their individual credit issuer selection data sets 12 to the optimization database 16, and the system 10 processes this data and provides the listing 24 to the consumer C. Of course, when the interface device 26 used by the consumer C is a personal computer 102, it is envisioned that the listing 24 of optimal credit products 22 is provided in electronic form and transmitted to the same interface device 26. Such communication would maximize the efficiency and speed of the method, and allow the system 10 to make virtually dynamic decisions and otherwise perform the optimization process for creating a listing 24. It is also envisioned that the method and system 10 can be used to create a variety of credit issuer reports 28 that can be provided to the credit issuer CI. As discussed in detail hereinafter, these credit issuer reports 28 could provide summary data, consumer C selection data, consumer C demographics, competing credit issuer CI data, etc.

Figure 3:
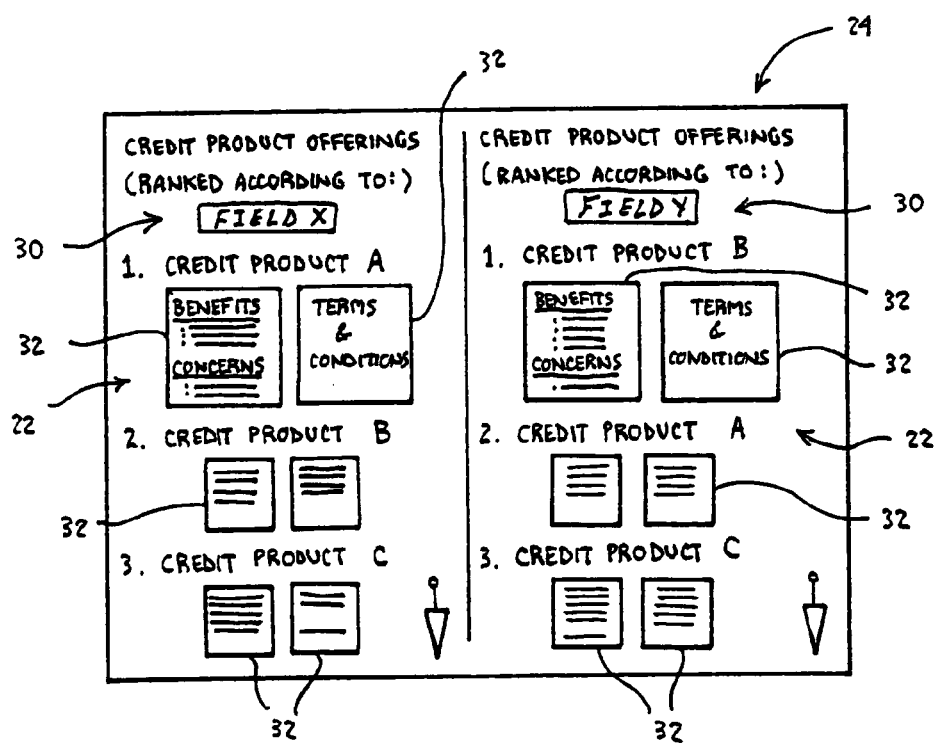
FIG. 3 is a schematic view of an example screenshot of a credit product offering to a consumer according to the present invention.

In another embodiment, and as illustrated in FIG. 3, the optimal credit products 22 can be ranked prior to presentation to the consumer C. For example, the optimal credit products 22 can be ranked according to at least one data field 14 in the credit issuer selection data set 12, and/or at least one data field 20 in the consumer selection data set 18. These ranked optimal credit products 22 can be organized to form the above-referenced listing 24, and subsequently presented as an organized list to the consumer C.

As seen in FIG. 3, the consumer C may request a ranking based upon multiple ranking fields 30. Furthermore, it may be the credit issuer CI that selects the ranking fields 30 for use in presenting multiple credit products 22 to the consumer C. FIG. 3 illustrates the presentation of at least three credit products, namely credit product A, credit product B and credit product C. Of course, as indicated by the arrow at the bottom right corner, this listing 24 could include any number of credit products 22. On the left is the credit product 22 offerings ranked according to field X, and on the right are credit product 22 offerings ranked according to field Y. Accordingly, it is envisioned that, based upon the differing data in the ranking fields 30, the credit products A, B and C could achieve different rankings.

A variety of data and data fields could be presented to the consumer C, and these data or data fields could be specifically associated with a specific optimal credit product 22. For example, and based upon the credit issuer selection data set 12 and consumer selection data set 18, an information box 32 could be provided. This information box 32 may include the perceived benefits of the optimal credit product 22, as well as the perceived concerns regarding the credit product 22. Of course, these benefits and concerns could be based either upon the data fields 20 in the consumer selection data set 18 and/or the data fields 14 and the credit issuer selection dataset 12.

In addition, these benefits and concerns could be used in connection with the ranking field 30 during the optimization process for ranking the credit products 22. For example, a numeric value may be assigned to specific benefits or concerns by the consumer C and/or the credit issuer CI. Based upon the numeric values, and the representative totals, the credit products 22 could be ranked. Also as seen in FIG. 3, the terms and conditions (T&Cs) could be provided to the consumer C in another information box 32. In addition, since such T&Cs are typically lengthy, it is envisioned that the information box 32 could be expanded for a fuller view by the consumer C.

It may be beneficial to the credit issuer CI that the listing 24 be presented to the consumer C in an individual and sequential form, such that the consumer C would only consider a single optimal credit product 22 at a time. In this manner, the credit issuer CI could more specifically direct the consumer's C attention to and encourage the consumer C to select a credit issuer CI desired product. Accordingly, the presentation of the credit products 22 to the consumer C may be under the control of the credit issuer CI through one or more of the data fields 14 in the credit issuer selection data set 12.

However, it is also envisioned that a system 10 can act as a selection and optimization engine on the consumer C side. For example, as illustrated in FIG. 3, the consumer C may select multiple ranking fields 30 and perform a side-by-side comparison of multiple credit products 22 based upon these ranking fields 30. In addition, it is envisioned that the consumer C could continue selecting and sorting within each ranking field 30 listing in order to eventually identify the absolute optimal credit product 22 for ultimate selection. Therefore, the method and system 10 of the present invention can be used as a general index for obtaining, reviewing, locating and identifying the optimal credit product 22 for selection by the consumer C.

As discussed above, the presently-invented method and system 10 can be used in connection with a variety of different credit products 22. For example, the credit product 22 may be a credit card, an online payment account, a co-branded credit account, a pre-approved credit product, a private label credit account, a debit account, a stored value account, a single transaction account, an option account to pay when due, etc. It is further envisioned that, based upon the data fields 20 in the consumer selection data set 18 and/or data fields 14 in the credit issuer selection data set 12, the listing 24 presented to the consumer C may include different types of credit products 22. For example, based upon the information and data provided by the consumer C, the method and system 10 may provide a mixture of credit products 22 that would fulfill the consumer's C needs. Accordingly, the assessment of the consumer's C needs could be taken into account and discussed in the information box 32 with respect to the benefits and concerns. Accordingly, the listing 24 may not be simply an offer of different credit cards, but an offer of different credit cards, online payment accounts, debit accounts, stored value accounts, etc. Any number of variations is envisioned for the optimization and subsequent offer and presentation of the optimal credit products 22 to the consumer C. Further, as discussed above, one or more of these credit products 22 could be selected in whole or in part to satisfy the debt incurred as instant credit at the point-of-sale POS.

As discussed above, the determination step may be based upon a computer-implemented algorithm, where the data fields 14 of the credit issuer selection data set 12 and the data fields 20 of the consumer selection data set 18 serve as the baseline input data for use in the optimization. Further, this computer-implemented algorithm may use a variety of formulae and data points, and the input data may be consumer C data, merchant data, credit issuer CI data, consumer C credit worthiness, consumer C credit quality, size of purchase, type of purchase, consumer C demographic data, consumer C age, consumer C location, consumer C income, consumer C credit data, consumer C purchasing behavior, consumer C purchasing behavior with a specified credit issuer CI, credit issuer CI sales objectives, credit issuer CI goals, consumer C purchasing history, consumer C status, consumer C lifetime value to the credit issuer CI, credit issuer CI input data, consumer C input data, product credit rate, product credit terms, product benefit data, product relationships, product tie-ins, consumer C purchasing behavior at a specified merchant, merchant objectives, merchant goals, consumer C lifetime value to merchant, merchant input data, etc. It is further envisioned that this algorithm can be modifiable, dynamic and configurable. For example, the algorithm can be based upon the credit issuer CI goals, the consumer C goals or other system 10 determinations.

In one preferred and non-limiting embodiment, the computer-implemented algorithm is directed to some initiation or request by the consumer C for the funding of a purchase or purchases. The system 100 is configured to assemble the appropriate dimensional data, calculate or build the appropriate algorithm and select an "offer" vector that represents the ranked offer map for each individual request.

On example of this process (as implemented by the system 100) is as follows. For the dimension of "Customer Profile", the metrics include: CP1—Number of open revolving trades; CP2—Total Revolving balances; CP3—Total revolving monthly payment; and CP4—Mortgage Present. For the dimension of "Purchase Profile", the metrics include: PP1—Item Category Code; PP2—Purchase Price; PP3—Merchant Identification; and PP4—Purchase Terms. For the dimension of "Merchant Profile", the metrics include: MP1—Merchant Category; MP2—Primary Accepted Loan Type; MP3—Secondary Accepted Loan Type; and MP4—Debit Acceptance Rate Index. In this example, the offer data, referred to as the "Offer Universe", would include the following data points: Revolving Loan Type 1 (RLTP1); Revolving Loan Type 2 (RLTP2); Promotional Loan Type 1 (PLTP1); Promotional Loan Type 2 (PLTP2); Installment Loan Type 1 (ILTP1); Installment Loan Type 2 (ILTP2); Direct Debit Type 1 (DDTP1): and Direct Debit Type 2 (DDTP2).

Using this information and data, the following algorithms are used to determine a desired "offer score" for use in connection with an offer to the consumer C. In this example the following algorithms are utilized: (1) Consumer Profile Thread (CPTF): CPT Factor=$0.0034065*PP1+$ 0.0476329*PP2+0.1283116*PP3+0.871211*PP4; (2) Purchase Profile Thread (PPTF): PPT Factor=0.2132485*PP1+ 0.1324954*PP2+0.7438293*PP3+0.9329232*PP4; and (3) Merchant Profile Thread (MPTF): MPT Factor=0.3565035*PP1+0.1003432*PP2+0.9512324*PP3+ 0.3293441*PP4. Next, and in this preferred embodiment of the algorithm, an "Offer Score" is calculated as follows: 0.4030312*CPTF+0.5121321*PPTF+0.7868544*MPTF+ 0.003431*CPTF$^2$+0.0019432*PPTF$^2$+0.0059695*MPTF$^2$. Finally an Offer Vector Map is created as illustrated in Table 1. It should be noted that, in this example, the 1st Quintile is designated as the lowest 20% of outcomes based upon the Offer Score, and the Offer Vector ranks the top three offers. In addition, it should be noted that this set of algorithms (or determination method) is only one example thereof, and these formulae may be modified in order to optimize the process to meet the goals of the consumer C, the merchant M, the credit issuer CI, etc.

TABLE 1

| Offer Score Range | Offer Vector | | |
|---|---|---|---|
| 1st Quintile | PLTP1 | RLTP2 | RLTP1 |
| 2nd Quintile | PLTP2 | PLTP1 | ILTP2 |
| 3rd Quintile | PLTP2 | RLTP2 | RLTP1 |
| 4th Quintile | RLTP1 | ILTP1 | DDTP1 |
| 5th Quintile | ILTP2 | DDTP1 | DDTP2 |

As discussed above, the consumer C can be provided with or have access to an interface device 26, such as a personal computer 102, website, electronic device, etc. It is also envisioned that the credit issuer CI also have access to some interface device 26 for inputting the appropriate data fields 14 of the credit issuer selection data set 12, and otherwise interacting with the system 10.

Gathering the appropriate data to make the optimization and offering decisions occurs throughout the method and process. Further, the data fields 20 of the consumer selection data set 18 may contain a variety of data and information. For example, the data fields 20 may be populated with data reflecting a consumer C name, a consumer C key, a consumer C identification, an account number, an address, a city, a state, a zip code, a country, a telephone number, an e-mail address, a social security number, a date of birth, the merchant's name, an identification, a credit issuer CI name, credit issuer CI data, credit data, credit product data, credit rate data, credit terms data, credit product benefits data, a product identification, a service identification, a company identity, a merchant identity, consumer C credit account balance, merchant history, private label entity data, affiliated private label entity, or any combination thereof.

Similarly, the method and system 10 collects a large amount of data and information from the credit issuer CI. For example, the data fields 14 of the credit issuer selection data set 12 may be populated with data reflecting historical interaction between the consumer C and the credit issuer CI, historical data, merchant data, previous consumer/credit issuer transaction data, consumer C creditworthiness, consumer C credit quality, size of purchase, type of purchase, consumer C demographic data, consumer C age, consumer C location, consumer C income, consumer C credit data, consumer C purchasing behavior, consumer C purchasing behavior with a specified credit issuer CI, credit issuer CI sales objectives, credit issuer CI goals, consumer C purchasing history, consumer C status, consumer C lifetime value to credit issuer CI, credit issuer CI input data, consumer C input data, product credit rate, product credit terms, product benefit data, product relationships, product tie-ins, consumer C purchasing behavior at a specified merchant, merchant objectives, merchant goals, consumer C lifetime value to merchant, merchant input data, a transaction amount, a consumer C purchase demographic, a product identification, a service identification, consumer C type, a company identity, a merchant identity, a third-party risk score, risk data, authentication data, verification data, consumer C rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, previous transaction data, time between transactions data, previous transaction amount, previous transaction approval status, previous transaction time stamp data, a response code, active trades in database, public record data, trade line data, transaction medium, credit segment data, consumer C payment type, consumer C payment method, consumer C payment history, consumer C account history, consumer C credit account balance, merchant history, private label entity data, affiliated private label entity, consumer/merchant historical data, negative consumer/credit issuer data, positive consumer/credit issuer data, or any combination thereof.

As part of the optimization process, the optimal credit product 22 can be based upon data input by the consumer C and/or the credit issuer CI. Accordingly, the credit issuer selection data set 12 and/or the consumer selection data set 18 may include credit product offering data that reflects an established offer to the consumer C of a service, an item, a discount, a redemption, a coupon, a voucher, a non-cash benefit, an incentive, a ticket, an invitation, an event, etc. Accordingly, such offerings may be listed under the "benefits" section of the listing 24 of the optimal credit products 22. For example, a non-cash benefit may be the offering of "frequent flyer miles" for an airline, or "points" for use in purchasing merchandise, etc. Many consumers C consider such non-cash benefits and other incentives when choosing an appropriate credit product 22.

In order to appropriately reward or offer benefits or incentives to the consumer C, it is envisioned that the credit issuer selection data set 12 includes certain consumer recognition data. For example, this consumer recognition data may be selected based upon some current transaction between the consumer C and a merchant, a previous transaction between the consumer C and the merchant, a historical transaction between the consumer C and the merchant, etc. In addition, the consumer recognition data may include tracking data specific to the consumer C, a value reflective of the consumer's C transaction history with a merchant, a current transaction between the consumer C and the credit issuer CI, a previous transaction between the consumer C and the credit issuer CI, and historical transaction data between the consumer C and the credit issuer CI. In addition, the consumer recognition data may include some value reflective of the consumer's C transaction history with the credit issuer CI, data associated with transactions with the credit issuer CI, transaction-specific data, consumer-specific data, transaction frequency data, transaction amount data, cumulative transaction frequency data, cumulative transaction frequency data, cumulative transaction amount data, consumer demographic data, etc. Accordingly, a variety of historical and/or collected data may be used to offer certain special benefits and incentives to the consumer C for selecting the optimal credit product 22. In addition, this consumer recognition data may be "negative" data, such that the credit issuer CI limits the optimal credit product 22 offerings based upon some past or historical negative event, such as credit problems.

As discussed above, the system 10 includes the central optimization database 16, which maintains the data fields 14 of the credit issuer selection data set 12 and the data fields 20 of the consumer selection data set 18. In addition, the optimization process may be engaged in or carried out by the system 10, a central processing system, the central system 106, the credit issuer CI, a merchant, a seller, an Internet site, an online entity, a web store, a telephone seller, a group of credit issuers CI, a group of merchants, an organization of credit issuers CI, an organization of merchants, an entity, a corporation, a company, an offerer of goods, an offerer of services, an affiliation of a plurality of entities, etc. In this manner, the system 10 (and associated method) could be maintained and engaged in by a variety of entities to maximize its application and usefulness to any specific entity. Therefore, the method could be optimized to meet the credit issuer's CI goals and objectives and/or the consumer C goals and objectives, or some balanced system maintained by a third party.

As discussed above, and as illustrated in FIG. 2, a credit issuer report 28 may be provided to the credit issuer CI. This credit issuer report 28 may include compiled credit issuer-specific data, credit product 22 data, consumer C data, consumer C selection data, consumer C behavior data, consumer C survey data, etc. Accordingly, after the consumer C selects at least one of the optimal credit products 22, it is envisioned that certain selection data may be obtained from the consumer C regarding his or her selection of a specific optimal credit product 22. For example, this selection data may include the reason for a selection, a reason for not selecting, data directed to the consumer selection, credit product 22 data, credit rate data, credit terms, credit benefits data, credit affiliation data, etc. Using this "survey"-type data, the credit issuer CI can better understand the consumer C behavior and the reasons behind his or her selection or failure to select.

As discussed above, the consumer C may transmit a data field 20 (as part of the consumer selection data set 18) that reflects the consumer's C requested credit product. Therefore, the method and system 10 must determine whether the consumer C is eligible for the requested credit product. This selection is referred to as the consumer preferred credit product 34. Alternatively, the consumer C may not have a specific credit product 34 in mind, but instead a preferred set of product terms 36. Therefore, as seen in FIG. 4, the consumer C provides the consumer preferred credit product 34 and/or credit product terms 36 to the system 10 as part of the data fields 20 transmitted to the optimization database 16.

The consumer C may receive various responses back from the system 10 based upon the data fields 20 of the consumer selection data set 18, as well as data fields 14 of the credit issuer selection data set 12. For example, the consumer C may receive a listing 24 indicating all of the optimal credit products 22 for which the consumer C is eligible, with a specific notation of the consumer preferred credit product 34. If the consumer C is not eligible for his or her consumer preferred credit product 34, a listing 24 may include such an indication, but indicate that the consumer C is eligible for other credit products 22.

Figure 4:
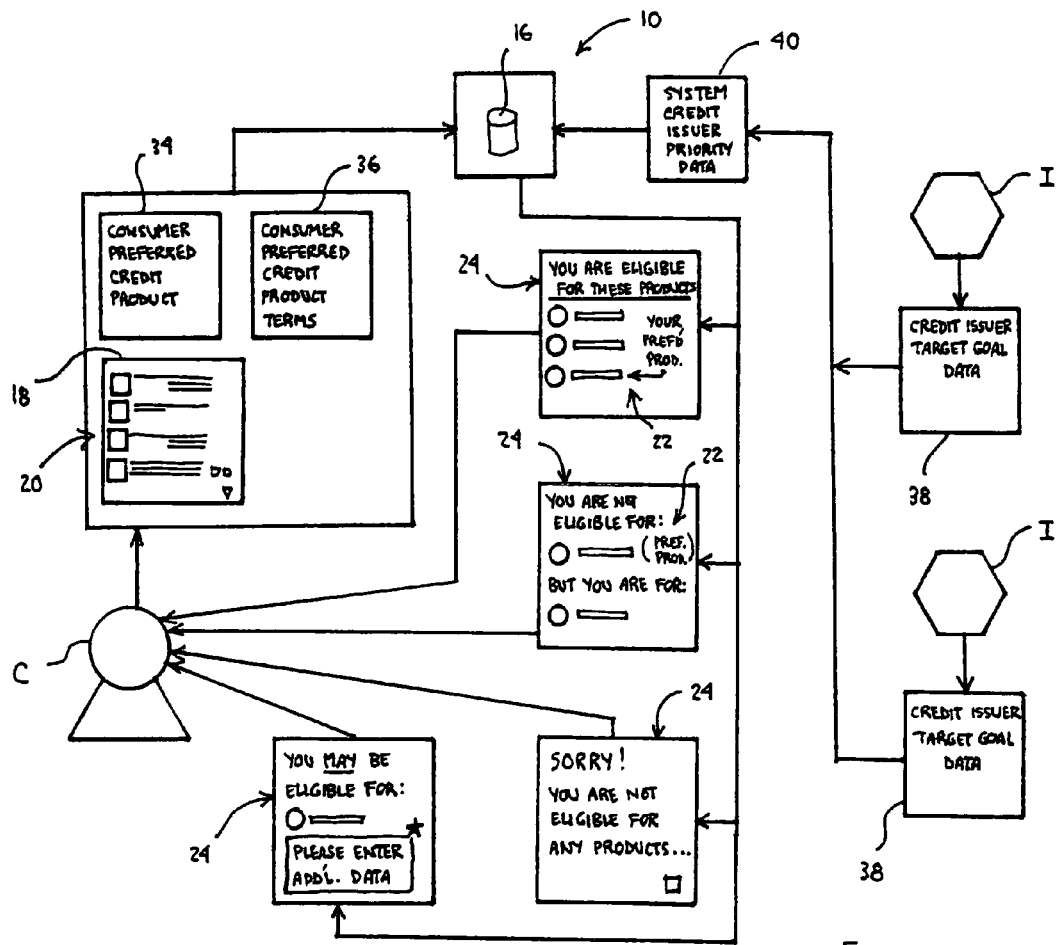
FIG. 4 is a schematic view of another embodiment of a method and system for identifying at least one optimal credit product according to the present invention.

Also as seen in FIG. 4, another option or response from the system 10 to the consumer C would be an indication that the consumer C is not eligible for any credit product 22. In many cases, the system 10 may require additional data fields 20 from the consumer C for identifying the optimal credit product 22 and/or the consumer's C eligibility for any of the credit products 22. Accordingly, one screen or response may be that the consumer C may be eligible for certain credit products 22, but additional data is required. Of course, if the consumer C has already been provided with instant credit, the consumer C would, of course, be eligible for some type of credit or debit product.

When engaging in the optimization process, the credit issuers CI may provide the system 10 and/or optimization database 16 with credit issuer target goal data 38. This data would be reflective of the individual credit issuer's CI goals and objectives regarding the types of preferred consumers C or data about these consumers C for which to tailor their credit products 22. It is envisioned that the credit issuer target goal data 38 from each credit issuer CI may be further analyzed and combined and/or compared with system credit issuer priority data 40. In this manner, the system 10 may include its own unique data fields, targets, goals and objectives regarding the optimization process and the matching of credit issuers CI and consumers C. Ultimately, the system 10 may have control over what is offered to and presented to the consumer C for selection.

Figure 5:
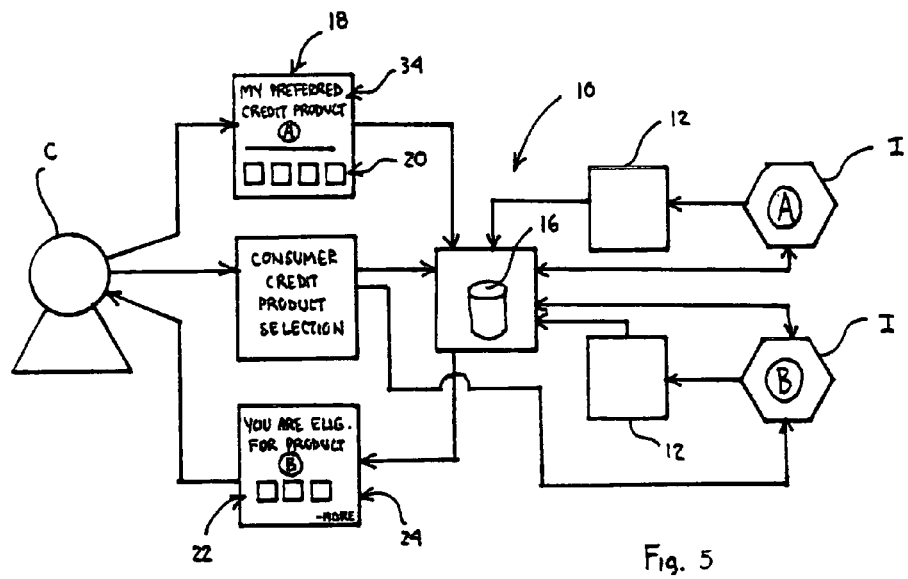
FIG. 5 is a schematic view of a further embodiment of a method and system for identifying at least one optimal credit product according to the present invention.

In another embodiment, as illustrated in FIG. 5, the consumer C transmits his or her preferred credit product 34, together with the appropriate data fields 20, in the consumer selection data set 18 to the system 10 and the optimization database 16. Further, multiple credit issuers CI (indicated as A and B), provide individual and discrete credit issuer selection data sets 12 to the system 10 and optimization database 16. It should be noted that, at this point, the consumer C has indicated that his or her preferred credit product 34 is a credit product of credit issuer A. After the optimization process, the system 10 may transmit a message to the consumer C that he or she is eligible for a credit product of credit issuer B. Of course, if the consumer C is also eligible for a credit product of credit issuer A, the system 10 could also indicate this in response to the consumer C, but may place it on a different page or different area. In this manner, the system 10 may have located a different optimal credit product 22 for the consumer C, based upon either the consumer C data fields 20 and/or the credit issuer CI data fields 14. It is further envisioned that the sequential listing of optimal credit products 22 may serve to urge the consumer C to select a specified and optimal credit product 22, as determined by the system 10.

Figure 6:
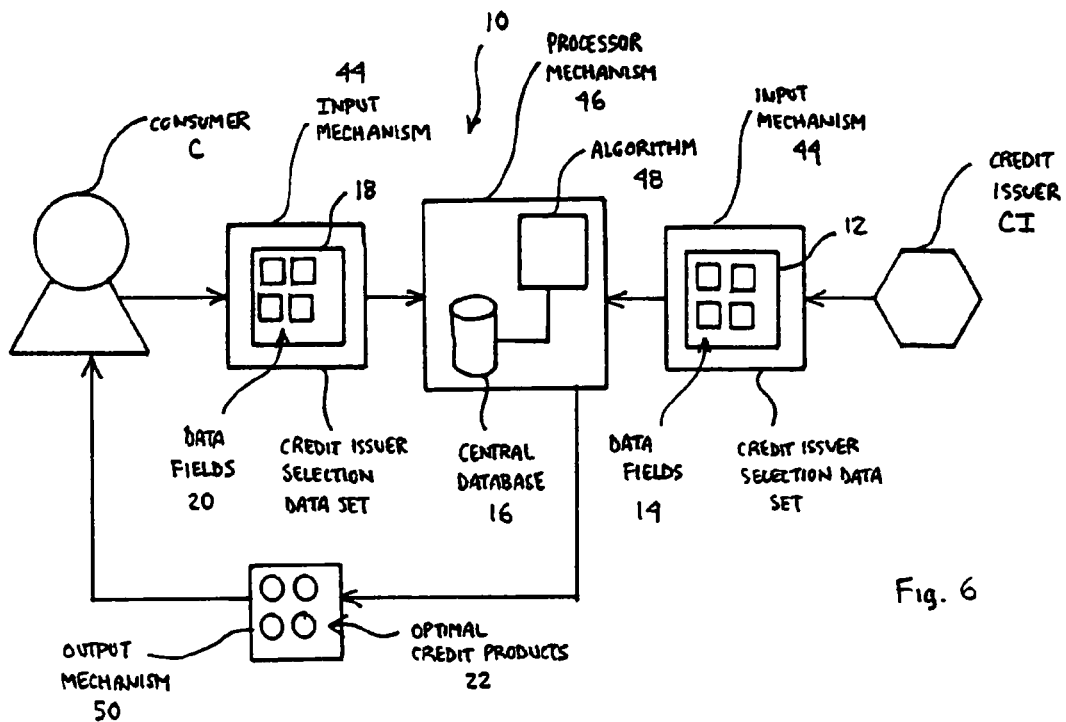
FIG. 6 is a schematic view of a still further embodiment of a method and system for identifying at least one optimal credit product according to the present invention.

As seen in FIG. 6, the present invention is further directed to an apparatus and system 10 for identifying the optimal credit products 22, as discussed above. In particular, the apparatus and system 10 would include a storage mechanism 42 including the central optimization database 16. Both the consumer C and the credit issuer CI could interface with an input mechanism 44 for transmitting the consumer selection data set 18 and credit issuer selection data set 12. In addition, the system 10 would include a processor mechanism 46 that is configured to determine one or more optimal credit products 22 to be offered by the credit issuer CI to the consumer C. Furthermore, the processor mechanism 46 could be programmed with software or hardware in order to execute an algorithm 48 for determining the optimal credit products 22, the respective rankings and list generation. Finally, the system 10 would include an output mechanism 50 for offering and presenting the optimal credit products 22 to the consumer C. Such an arrangement is illustrated in schematic form in FIG. 6.

Figure 7:
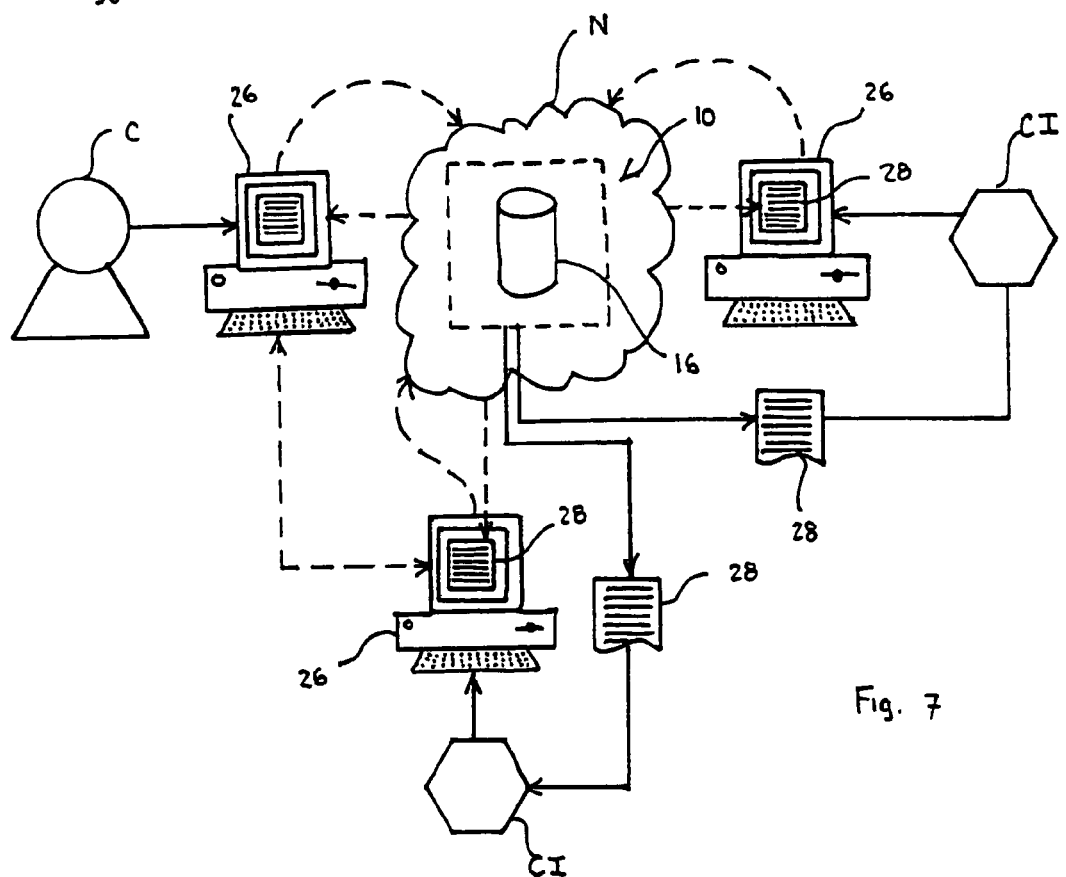
FIG. 7 is a schematic view of yet another embodiment of a method and system for identifying at least one optimal credit product according to the present invention.

Yet another embodiment is illustrated in FIG. 7. In this embodiment, the method and system 10 are in the form of a wireless network system, where communications are occurring over a network N. Accordingly, the consumer C transmits the data fields 20 and the consumer selection data set 18 to the system 10 over the network N. Furthermore, the credit issuers CI provide data fields 14 of the credit issuer selection data set 12 over the network N to the system 10. In this embodiment, the consumers C and credit issuers CI use an interface device 26 in the form of a wireless computing device, such as a computer or terminal connected to the Internet or other device capable of wireless communication. Of course, the method and system 100 described above could also be used in connection with and over the network N.

Next, the listing 24 of optimal credit products 22 is transmitted to the interface device 26 of the consumer C, and the consumer's C selection can be transmitted to the system 10 and/or directly to the credit issuer CI. Accordingly, the system 10 may facilitate direct communications and contact between the consumer C and the selected credit issuer CI. In addition, the above-discussed credit issuer report 28 may be transmitted wirelessly to the interface device 26 of the respective credit issuer CI, or alternatively, a hard copy of the credit issuer report 28 may be sent to the credit issuer CI.

In this manner, the present invention provides a method and system 10 for identifying one or more optimal credit products 22 for offering and presentation to a consumer C. Further, the method and system 10 can take into account the consumer selection data set 18 and/or the credit issuer selection data set 12 during the optimization process. The optimal credit products 22 may be identified based upon the credit issuer's CI goals and objectives and/or the consumer's C goal and objectives. Therefore, the present invention provides a method and system 10 for identifying optimal credit products 22 that operates effectively in both a "down sell" and "up sell" situation. Further, the present invention provides a system 100 for engaging in an instant credit transaction between a consumer C and a merchant M, which allows for the satisfaction of the debt after the transaction has been consummated between the consumer C and merchant M.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for identifying at least one optimal credit product from a plurality of credit products of at least one credit issuer to a consumer, the method comprising the steps of:
    receiving a credit issuer selection data set including a plurality of data fields by a central optimization database resident in a storage mechanism;
    receiving a consumer selection data set including a plurality of data fields by the central optimization database, wherein at least one of the plurality of data fields includes the consumer's goals and objectives, wherein the consumer selection data set is presented to the consumer during a transaction between the consumer and a merchant in connection with user pre-selected goods and/or services at a point of sale of the merchant;
    determining, by a processor mechanism, at least one optimal credit product to be offered by the at least one credit issuer to the consumer based upon: (i) at least one data field in the credit issuer selection data set; (ii) at least one data field in the consumer selection data set, or any combination thereof; and
    offering at least one new optimal credit product of the at least one credit issuer, to the consumer at time of payment or consummation of the transaction between the consumer and the merchant at the point of sale of the merchant, wherein the at least one optimal credit product takes into account the consumer's goals and objectives, wherein all of the at least one credit issuer, the consumer and the merchant interact or otherwise communicate with the point of sale of the merchant.

2. The method of claim 1, wherein the offering further comprises offering a plurality of optimal credit products to the consumer.

3. The method of claim 2, wherein the optimal credit products are presented to the consumer in a hardcopy form, a wireless form, an electronic form, on a computing device, on a display device, over the Internet, as a web page, on a graphical user interface, at the point-of-sale, before the transaction, during the transaction, upon completion of the transaction, or any combination thereof.

4. The method of claim 2, wherein the plurality of optimal credit products offered to the consumer are ranked according to: (i) at least one data field in the credit issuer selection data set; (ii) at least one data field in the consumer selection data set, or any combination thereof.

5. The method of claim 4, further comprising the steps of:
    organizing the plurality of ranked credit products in the form of a list; and
    presenting the organized list to the consumer.

6. The method of claim 5, wherein the ranked credit products are presented to the consumer in a hardcopy form, a wireless form, an electronic form, on a computing device, on a display device, over the Internet, as a web page, on a graphical user interface, at a point-of-sale, before a transaction, during a transaction, upon completion of a transaction, or any combination thereof.

7. The method of claim 5, further comprising the step of individually and sequentially presenting the plurality of ranked credit products to the consumer.

8. The method of claim 1, wherein the credit product is a credit card, an online payment account, a co-branded credit account, a pre-approved credit product, a private label credit account, a debit account, a stored value account, a single transaction account, an option account to pay when due, or any combination thereof.

9. The method of claim 1, further comprising receiving offers from a plurality of credit issuers, each credit issuer providing at least one of the plurality of credit products.

10. The method of claim 1, wherein the determination step is based upon a computer-implemented algorithm and based at least in part upon consumer data, merchant data, credit issuer data, consumer creditworthiness, consumer credit quality, size of purchase, type of purchase, consumer demographic data, consumer age, consumer location, consumer income, consumer credit data, consumer purchasing behavior, consumer purchasing behavior with a specified credit issuer, credit issuer sales objectives, credit issuer goals, consumer purchasing history, consumer status, consumer lifetime value to credit issuer, credit issuer input data, consumer input data, product credit rate, product credit terms, product benefit data, product relationships, product tie-ins, consumer purchasing behavior at a specified merchant, merchant objectives, merchant goals, consumer lifetime value to merchant, merchant input data or any combination thereof.

11. The method of claim 10, wherein the algorithm is at least one of modifiable, dynamic and configurable.

12. The method of claim 1, wherein the determining further comprises calculating an offer score based at least in part upon consumer data, purchase profile data and merchant profile data.

13. The method of claim 12, wherein the determining is performed by a computer-implemented algorithm.

14. The method of claim 13, wherein the algorithm is at least one of modifiable, dynamic and configurable.

15. The method of claim 1, wherein at least a portion of data fields of the consumer selection data set are at least partially based upon data received from the consumer.

16. The method of claim 1, wherein at least a portion of data fields of the credit issuer selection data set are at least partially based upon data received from the credit issuer, a merchant affiliated with the credit issuer or any combination thereof.

17. The method of claim 1, further comprising the step of providing an interface to the credit issuer for inputting at least one data field in the credit issuer selection data set.

18. The method of claim 1, further comprising the step of providing an interface to the consumer for inputting at least one data field in the consumer selection data set.

19. The method of claim 1, wherein at least one of the plurality of data fields in the consumer selection data set is populated with data reflecting a consumer's name, a consumer key, a consumer identification, an account number, an address, a city, a state, a zip code, a country, a telephone number, an e-mail address, a social security number, a date of birth, the merchant's name, an identification, a credit issuers name, credit issuer data, credit data, credit product data, credit rate data, credit terms data, credit product benefits data, a product identification, a service identification, a company identity, a merchant identity, consumer credit account balance, merchant history, private label entity data, affiliated private label entity, or any combination thereof.

20. The method of claim 1, wherein at least one of the plurality of data fields in the credit issuer selection data set is populated with data reflecting historical interaction between the consumer and the credit issuer, historical data, merchant data, previous consumer/credit issuer transaction data, consumer creditworthiness, consumer credit quality, size of purchase, type of purchase, consumer demographic data, consumer age, consumer location, consumer income, consumer credit data, consumer purchasing behavior, consumer purchasing behavior with a specified credit issuer, credit issuer sales objectives, credit issuer goals, consumer purchasing history, consumer status, consumer lifetime value to credit issuer, credit issuer input data, consumer input data, product credit rate, product credit terms, product benefit data, product relationships, product tie-ins, consumer purchasing behavior at a specified merchant, merchant objectives, merchant goals, consumer lifetime value to merchant, merchant input data, a transaction amount, a consumer purchase demographic, a product identification, a service identification, consumer type, a company identity, a merchant identity, a third-party risk score, risk data, authentication data, verification data, consumer rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, previous transaction data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, merchant history, private label entity data, affiliated private label entity, consumer/merchant historical data, negative consumer/credit issuer data, positive consumer/credit issuer data, or any combination thereof.

21. The method of claim 1, wherein the credit issuer selection data set, the consumer selection data set, or any combination thereof includes credit product offering data reflecting an established offer to the consumer of a service, an item, a discount, a redemption, a coupon, a voucher, a non-cash benefit, an incentive, a ticket, an invitation, an event, or any combination thereof.

22. The method of claim 1, wherein the credit issuer selection data set includes consumer recognition data, which is selected based upon: a current transaction between the consumer and a merchant; a previous transaction between the consumer and a merchant; a historical transaction data between the consumer and a merchant; tracking data specific to a consumer; a value reflective of the consumer's transaction history with a merchant; a current transaction between the consumer and the credit issuer; a previous transaction between the consumer and the credit issuer; a historical transaction data between the consumer and the credit issuer; a value reflective of the consumer's transaction history with the credit issuer; data associated with transactions with a credit issuer; transaction-specific data; consumer-specific data; transaction frequency data; transaction amount data; cumulative transaction frequency data; cumulative transaction amount data; consumer demographic data, or any combination thereof.

23. The method of claim 1, wherein the credit issuer selection data set, the consumer selection data set, or any combination thereof is at least one of in communication with and maintained by a system, a central processing system, a credit issuer, a merchant, a seller, an Internet site, an online entity, a web store, a telephone seller, a group of credit issuers, a group of merchants, an organization of credit issuers, an organization of merchants, an entity, a corporation, a company, an offeror of goods, an offeror of services, an affiliation of a plurality of entities, or any combination thereof.

24. The method of claim 1, further comprising the step of presenting the credit issuer with a report including compiled credit issuer-specific data, credit product data, consumer data, consumer selection data, consumer behavior data, consumer survey data or any combination thereof.

25. The method of claim 1, further comprising the step of receiving a selection made by the consumer for at least one optimal credit product.

26. The method of claim 1, further comprising the steps of:
presenting a plurality of optimal credit products to the consumer; and
receiving a selection made by the consumer for at least one of the plurality of credit products.

27. The method of claim 26, further comprising the step of obtaining, from the consumer, selection data regarding the selection of the consumer.

28. The method of claim 27, wherein the selection data is a reason for selection, a reason for not selecting, data directed to the consumer selection, credit product data, credit rate data, credit terms data, credit benefits data, credit affiliation data or any combination thereof.

29. The method of claim 1, wherein the consumer selection data set includes at least one data field reflecting a consumer's preferred credit product or preferred credit product terms, the method further comprising the step of determining whether the consumer is eligible for the preferred credit product or preferred credit product terms.

30. The method of claim 29, further comprising the steps of:
  if the consumer is eligible for the preferred credit product, offering to the consumer: (1) the preferred credit product; (2) a plurality of credit products for which the consumer is eligible, including the preferred credit product; or (3) a plurality of credit products for which the consumer is eligible, not including the preferred credit product; and
  if the consumer is not eligible for the preferred credit product, offering to the consumer: (1) another credit product with terms similar to the preferred credit product; (2) a plurality of credit products for which the consumer is eligible; or (3) an indication of no eligible credit products.

31. The method of claim 1, further comprising receiving a selection made by the consumer for at least one credit product to satisfy a credit amount associated with a transaction between the consumer and a merchant.

32. An apparatus for identifying at least one optimal credit product from a plurality of credit products of at least one credit issuer to a consumer, the apparatus comprising:
  a storage mechanism including a central optimization database;
  at least one input mechanism for receiving a credit issuer selection data set including a plurality of data fields by a central optimization database and for receiving a consumer selection data set including a plurality of data fields by the central optimization database, wherein at least one of the plurality of data fields of the consumer selection data set includes the consumer's goals and objectives, wherein the consumer selection data set is presented to the consumer during a transaction between the consumer and a merchant in connection with user pre-selected goods and/or services at a point of sale of the merchant;
  a processor mechanism configured to determine at least one optimal credit product to be offered by the at least one credit issuer to the consumer based upon: (i) at least one data field in the credit issuer selection data set; (ii) at least one data field in the consumer selection data set, or any combination thereof; and
  an output mechanism for offering at least one optimal credit product of the at least one credit issuer, to the consumer, at time of payment or consummation of the transaction between the consumer and the merchant at the point of sale of the merchant, wherein the at least one optimal credit product takes into account the consumer's goals and objectives, wherein all of the at least one credit issuer, the consumer and the merchant interact or otherwise communicate with the point of sale of the merchant.

* * * * *